United States Patent Office 2,865,867
Patented Dec. 23, 1958

2,865,867
SOLID CONTACT MATERIAL

Ross E. Van Dyke, Orinda, and Richard P. Trainer, Pleasant Hill, Calif., assignors to Shell Development Company, New York, N. Y., a corporation of Delaware No Drawing. Application December 26, 1956
Serial No. 630,444

10 Claims. (Cl. 252—455)

This invention relates to improved molecular sieve composites and to their preparation. More particularly the invention is concerned with the preparation of composites comprising molecular sieve zeolites and alumina, having improved physical characteristics.

It is well known to the art that certain zeolites having rigid three-dimensional anionic networks with intra-crytalline interstitial channels whose narrowest cross-section has essentially a uniform diameter, e. g. in the range from 3 to 13 Angstrom units, have the characteristic of selectively sorbing from a mixture compounds whose maximum critical molecular diameter is not substantially larger than said channel diameter. These zeolites are known as "molecular sieves" and the intra-crystalline channels are known as "pores." Such zeolites are described, for example, in a paper entitled "Zeolites as Absorbents and Molecular Sieves" by R. M. Barrer, "Annual Reports on the Progress of Chemistry for 1944," vol. 41, pp. 31–46, London (1945) and in U. S. Patent 2,306,610 to Barrer. More recently certain synthetic molecular sieves have become commercially available from Linde Air Products Company.

The zeolitic molecular sieves are characterized by very great selectivity for sorbing compounds of a given maximum critical molecular diameter and by a very high capacity for the sorption of such compounds. The sieves are, therefore, useful for separating compounds of a given maximum critical molecular diameter out of mixtures containing other compounds of larger molecular diameter. They are, however, soft and friable materials. Crystallites of synthetic molecular sieves, for example, are generally very soft powdery materials. It is known to form these crystallites into larger particles by using from 10 to 20% of a binder material, such as clay. This results in larger particles, e. g. from 1 to 3 mm. in diameter, which are sufficiently hard to be usable in the form of fixed beds of sorbent in commercial separation processes. Even these composites, however, are much too soft and friable to be useful in operations in a fluidized system. It is generally recognized that the use of a solid contact material in the form of a fluidized mass of particles is often commercially superior to the use of the same contact material as a fixed bed because of the much greater flexibility of fluidized solids operations.

A special composite capable of selectively sorbing normal paraffins and having the empirical formula 4CaO.Al$_2$O$_3$.4SiO$_2$ has been reported as being a powder which is made into agglomerates of moderate strength by drying in the form of a moist cake; it is said to be suitable for use in a fluidized solids separation of normal hydrocarbons. (U. S. 2,442,191 and 2,522,426). The maximum capacity reported for this composite is less than 5 cc. of n-butane/gram of composite, which contrasts with capacities in the range of 25 cc. of n-butane/gram of composite for presently available commercial molecular sieves.

It has now been found, in accordance with this invention, that composites can be prepared which retain the full sorption capacity of the molecular sieves for selected compounds while being sufficiently hard and attrition resistant to be suitable for operation in fluidized solids systems.

It is a major object of this invention to provide a method for preparing molecular sieve composites suitable for use as fluidized solids in sorptive separation processes. It is a further object to provide a method for preparing composites of molecular sieve zeolites and alumina having high attrition resistance and high sorption capacity. It is a further object to provide composites of molecular sieve zeolites and alumina suitable for use as fluidized solids in sorptive separation processes.

In accordance with this invention, molecular sieve composites are prepared by mixing zeolitic molecular sieve sorbent with wet gelatinous aluminum hydroxide which is substantially free of ions of soluble salts, in a weight ratio of zeolite to alumina of no more than about 2:1, and drying the composite. The composite is activated by further heating, which may be referred to as calcining, under conditions sufficient to drive off the water held in the interstices of the zeolite.

The composites prepared according to this invention contain alumina and up to about 65% by weight, based on the calcined composite, of zeolitic molecular sieve solids and are characterized by substantial hardness and attrition resistance and by a sorption capacity substantially equal to or in excess of that of the amount of uncomposited molecular sieve present in the final composite. Composites prepared in accordance with this invention should have sufficient resistance to attrition so that the "Percent attrition" after 24 hours, tested by the accelerated test described in section VII of "Test Methods for Synthetic Cracking Catalyst" (American Cyanamid Co., Refinery Chemicals Department, New York, 1953; LEAF. 507-2M-8/53 B. P.), is no more than about 20% and preferably less than 12%.

Although composites of excellent hardness, attrition resistance and sorption capacity are prepared from aluminum hydroxide and zeolites in accordance with this invention, it was found that satisfactory composites could not be prepared by using instead of aluminum hydroxide any of a number of other gelatinous hydroxides which are otherwise quite similar to aluminum hydroxide. It was also found that composites of satisfactory hardness were no longer obtained when the content of about 65% zeolite in the total dry composite was exceeded. It was further found that the sorption capacity of a molecular sieve zeolite for compounds to which it is normally selective was destroyed in composites prepared by mixing the sieve with gelatinous aluminum hydroxide in the presence of substantial amounts of ions of soluble salts.

In the preparation of composites according to this invention, the wet gelatinous aluminum hydroxide may be prepared in a number of ways which are known to the art.

A preferred method is to precipitate aluminum hydroxide from an aqueous solution of an aluminum salt by addition of a base, e. g. ammonium hydroxide or sodium hydroxide, to a pH above 7, e. g. between 7.5 and 9.5. Aluminum sulfate is preferred as the aluminum salt. Aluminum nitrate and aluminum chloride are also suitable. Other water-soluble aluminum salts may be employed. Instead of aqueous bases, the salts of strong bases with weak acids may be used as precipitant, e. g. ammonium carbonate or sodium carbonate.

The aluminum hydroxide may be prepared by adding a mineral acid, e. g., sulfuric acid, to an aqueous solution of an alkali metal aluminate, e. g., sodium aluminate. The pH may be on the basic side or on the acid side, e. g. between 10.0 and 3.0, when the addition of acid has been completed.

The aluminum hydroxide may also be prepared by hydrolysis of organic aluminum compounds, e. g. aluminum alcoholates such as aluminum ethylate, propylate, isobutylate, etc., and aluminum trialkyls, such as aluminum triethyl. The alcoholate may be used as such or in solution in an organic solvent, e. g. in an alcohol or in an aromatic hydrocarbon such as xylene. The hydrolysis may be carried out by means of water vapor or liquid water.

Other methods of preparing aluminum hydroxide may be employed, e. g. the hydrolysis of aluminum amalgam or the electrolysis of aluminum in an aqueous electrolyte. Suitable methods of preparing aluminum hydroxide gels are described in "Aktive Tonerde" by Franz Krczil, F. Enke, Stuttgart, 1938.

The above-described methods of preparing gelatinous aluminum hydroxide are not full equivalents of each other in the preparation of composites according to this invention. Thus, very hard composites have been prepared by precipitation of the gelatinous aluminum hydroxide from aluminum sulfate by means of ammonia to a pH of about 9.3. Softer composites have been prepared by precipitation from aluminum nitrate with ammonia to a pH of 9.3, by precipitation from aluminum chloride with ammonia to a pH of 7.5 both with and without peptization, and by precipitation from sodium aluminate with sulfuric acid to a pH of 10.0.

Gelatinous aluminum hydroxide prepared in a manner which leaves metal or ammonium ions in the wet gel is then freed of these ions. Generally this is accomplished by washing the precipitated gel with pure water, e. g. water which has been distilled or which has been freed of metal ions by ion exchange, until substantially all foreign ions are removed from the gel. The washing of aluminum hydroxide hydrogel is known to the art and is described, for example, in the book by Krczil, pp. 41–44. Small amounts of ammonia or metal ions, e. g. up to one-half percent by weight of the dry composite, may be retained in the wet gel without seriously affecting the strength or effectiveness of the composite material. If desired, the gel may be washed until the wash water is entirely free of ammonia or metal ions, in which case the gel will be generally in peptized form.

After the gelatinous aluminum hydroxide has been prepared in a form substantially free of ions of soluble salts, molecular sieve solid in the form of a powder is added thereto in a proportion such that the weight ratio of molecular sieve to alumina in the final composite does not exceed about 2:1. The concentration of molecular sieve in the calcined composite is preferably between 25 and 50% by weight. It may be less but this results in no further advantage and is disadvantageous because the sorption capacity of the total composite is thus reduced. Composites of satisfactory hardness may be prepared with up to about 65% by weight of the sieve in the final product but as the amount of molecular sieve increases beyond this point hardness is lost, so that above 65% the composites are no longer sufficiently attrition resistant for use in fluidized operations. The molecular sieve may be combined with the wet gelatinous aluminum hydroxide by adding the predetermined amount of the dry crystallite particles directly, or the crystallites may be slurried in water which is substantially free of cations of soluble salts and the resulting slurry mixed with the gelatinous aluminum hydroxide. The latter is preferably slurried in a substantial amount of water prior to addition of the sieve.

The crystallites of molecular sieve employed in this invention are preferably in the size range from 0.5 to 5 microns average diameter but they may be somewhat larger or smaller. If natural zeolites are employed, they are preferably first ground to the approximate size range mentioned before being admixed with the aluminum hydroxide gel. At least a part of the molecular sieve may be supplied in the form of fines of composites prepared according to this invention, such fines having been recovered in the preparation of the composite or in the sorptive separation in which the composite is used. For example, the fines resulting from attrition in a fluidized separation can be reused in the preparation of fresh composite.

The composites of zeolitic molecular sieve and aluminum hydroxide obtained in accordance with any of the methods above described may be made into a contact mass and finished in any known or desired manner, including drying and forming into the desired shapes and sizes. For use in fixed or moving beds they may be extruded and then dried or may be dried and then broken up into particles of suitable size and pelleted. For use in a fluidized system the mass is dried, calcined, and suitably ground to a size range from 40 to 150 microns (100–325 mesh).

Irregular shaped masses or pieces of the composite contact mass may be formed by breaking up a dry filter cake, or more regular sizes and shapes may be obtained by tableting, molding, casting or extruding the wet or wetted comminuted material. In those cases where the alumina has been washed to peptization, the composite of sieve and aluminum hydroxide may be allowed to set as droplets to a hydrogel in a static or turbulent water-immiscible liquid to produce spheroidal contact particles. Satisfactory spheroidal particles, suitable for use as fluidized solids, can also be prepared by spraying the wet composite into a drying chamber in the well known spray-drying technique.

Prior to use as sorbent, the composite is calcined under conditions sufficient to activate the molecular sieve by driving out the water held in the interstitial channels. Heating in a stream of air at temperatures from about 300 to 350° C. for at least about one-half hour is generally sufficient. Somewhat better activation is obtained by heating in the preferred range of temperatures from 450 to 550° C. for at least about one-half hour. The hardness of the composites is improved by calcining at 400° C. or higher. Temperatures up to 600° C. and times from one-half to 24 hours or more may be employed. It is generally preferred to drive off physically held water by drying, e. g. between 120 and 150° C. prior to calcining at the higher temperature, since rapid removal of water at a high temperature may damage the composite particles.

Zeolitic molecular sieve sorbents suitable for use in this invention include natural molecular sieves, e. g. chabazite, active analcite, gmelinite, and mordenite; modifications of naturally occurring zeolitic molecular sieves prepared by ion exchange from the original crystal, e. g. calcium and barium base exchanged mordenites; and synthetic molecular sieve zeolites, e. g.

$$BaAl_2.Si_4O_{12}.nH_2O$$

described by Barrer, and the group of synthetic molecular sieves which have recently become available from Linde Air Products Company. One of the latter molecular sieves is designated MS–4A. It is a zeolite of average composition $$0.96 \pm 0.04 Na_2O.1.00Al_2O_3.1.92 \pm 0.09 SiO_2$$

plus an amount of water depending on the degree of dehydration; the crystals are cubic with unit cells measuring, on an edge, approximately 12.26 Angstrom units, and are characterized by an essentially uniform pore diameter of about 4 Angstrom units. Another sieve available from Linde is designated MS–5A. This is made from MS–4A by replacement of approximately 75% of the sodium ions with calcium ions by ion exchange. Its average composition is $$0.25Na_2O.0.75CaO.1.00Al_2O_3.2.0SiO_2$$

its cubic crystals have about the same unit cell dimensions as MS–4A and are characterized by an essentially uniform pore diameter of about 5 Angstrom units. A third available sieve, designated MS–13X, has the approximate formula $0.83 \pm 0.05 Na_2O.1.00Al_2O_3.2.48 \pm 0.03SiO.nH_2O$. It has cubic crystals with unit cells measuring, on an edge, approximately 24.95 Angstrom units. The essentially uniform pore diameter is about 13 Angstrom units.

The basis of the separation of sorbable compounds from non-sorbable compounds by means of zeolitic molecular sieves appears to be that the cross-section of the sorbable molecule at its widest point, designated the critical molecular cross-section, must be below a certain limiting area, characteristic of the narrowest cross-section of the pores in the zeolite. The length of the molecule and its molecular volume are of secondary importance only. In the case of a disc-shaped molecule, e. g. a cyclohydrocarbon, the distance across the disc in its shortest dimension in the plane of the disc is the governing factor. Many molecules which have a critical molecular diameter essentially the same or even a few hundredths of an Angstrom unit larger than the critical pore diameter of the zeolite are nevertheless absorbed by a process known as activated absorption. Other molecules of smaller cross-section are more readily absorbed and diffuse into the channels of the zeolite more quickly. Barrer, in the above-mentioned paper, classifies molecular sieves in three classes characterized by different maximum pore diameters and consequently by the ability to sorb different compounds selectively. Among the most useful separations are the sorption of water from methane or a natural gas by class III mineral; water from propane or higher hydrocarbons by a class II mineral; methane or ethane from higher hydrocarbons by a class II mineral; and normal paraffins or normal olefins of at least three or four carbon atoms per molecule from non-normals such as branched-chain aliphatics and cyclics by class I minerals. Particularly useful separations are those of normal paraffins or olefins from branched or cyclic hydrocarbons by means of Linde molecular sieve type MS–5A.

In the use of the composites prepared in accordance with the present invention the same separations can be carried out with the composite that could be carried out with the uncomposited molecular sieve material.

The general operating conditions employed in the sorptive separation steps are the same as in separations employing the uncomposited molecular sieve. Thus, the temperature in the sorption step may vary from room temperature up to 600° C., the pressure may vary from atmospheric or sub-atmospheric to as high as 1000 p. s. i. g. or higher and the liquid hourly spaced velocity of the charge may vary from as little as 0.1 to 40 v./v./hr. or higher. The separation process may be carried out in liquid or vapor phase.

The separation processes are generally carried out by contacting a mixture of a material capable of being selectively occluded in the molecular sieve and a material not capable of being occluded with the mass of molecular sieve until the capacity of the sieve for sorption of the selectively separable material is substantially filled, and then desorbing the occluded material from the sieve, e. g., by heat and vacuum or by passage of an inert gas through the contact mass. The conditions in the desorption step may be the same insofar as pressure, temperature, and flow rates are concerned as in the sorption step or higher temperatures within the range up to 600° C., higher flow rates and different pressures may be employed.

The processes may be carried out using a fixed or moving bed of particles of the composites of this invention, but it is particularly advantageous to use the composites as fluidized powders in processes employing the well known fluidized solids technique.

The following examples illustrate various aspects of the present invention but are not to be considered a limitation thereof.

Example I

Composite No. 1 was prepared as follows: 854 ml. of 5.78 N aqueous ammonium hydroxide was added over a period of 48 minutes to 980 ml. of 1 M aluminum nitrate solution. The resulting slurry of gelatinous aluminum hydroxide had a pH of 9.3. The water was removed from the aluminum hydroxide by a suction filter and the resulting cake was washed with three washes of approximately 7 l. of distilled water, each. The washed aluminum hydroxide was reslurried with 450 ml. of distilled water; 16.7 g. of Linde molecular sieve type MS–5A was added and the mixture well stirred. The resulting composite was dried at 120° C. It was a hard material, containing 25% by weight of molecular sieve, based on the calcined mass. The composite was found to have retained 0.035% by weight of ammonia, calculated as $NH_4$ based on calcined composite. A portion of the composite was calcined by heating in a stream of air at 450° C. for about one-half hour.

A portion of composite No. 1 was crushed and screen-graded to form a 20×45 mesh mixture, which was placed in a column where it was further dried at 300° C. for one-half hour and calcined at 550° C. for two hours in a stream of helium. The resolution of non-normal hydrocarbons from normal hexane by means of this composite was determined at several temperatures and compared with similar runs made with a commercial Linde molecular sieve MS–5A containing 20% clay binder. It was shown that the composite had retained its molecular sieve property and that the resolution of the non-normal hydrocarbons from the normals was about the same as with the commercial molecular sieve.

The capacity of calcined composite No. 1 for sorbing normal hydrocarbons was determined by means of a technique similar to that described by James and Phillips, J. Chem. Soc., 1954, 1066. In this procedure a stream of normal butane is mixed with helium carrier gas; the mixture is sampled for analysis and is then introduced into an adsorption column maintained at 150° C. The exhaust gas from the column is monitored for butane content, the relative concentration of normal butane and helpium being recorded. The molecular sieve is considered saturated when the normal butane concentration in the effluent gas becomes constant. The actual capacity of the sorbent is computed from the analysis of the inlet gas mixture and from the time necessary for complete saturation of the sieve. It is calculated at standard conditions of temperature and pressure. Composite No. 1 was found to have a capacity of 23.9 cc. of n-butane per gram of molecular sieve present. This compares with a capacity of 19.5 for the uncomposited Linde molecular sieve MS–5A itself, determined in the same manner. The increased capacity may be due to the alumina present in the composite.

A composite of equally satisfactory hardness and sorption capacity for normal hydrocarbons as composite No. 1 is prepared by substituting ground chabazite for the MS–5A in the above preparation. Similarly, a composite of satisfactory hardness and sorption capacity for water, methane, ethane, etc. is prepared by substituting Linde molecular sieve MS–4A for the MS–5A. A composite of satisfactory hardness and sorption capacity for unbranched cyclic hydrocarbons is prepared by substituting Linde molecular sieve MS–13X for the MS–5A.

Example II

Composite No. 2 was prepared from an aqueous solution of aluminum chloride in a manner otherwise similar to the preparation of composite No. 1. 314 ml. of 6.03 M aqueous ammonium hydroxide was added to 568 ml. of 1.03 M aluminum chloride over a period of 17 minutes, resulting in a slurry having a pH of 7.5. The gelatinous aluminum hydroxide was washed two times with distilled water, resulting in peptization of the gel. 5 g. of Linde MS–5A molecular sieve, slurried in 100 ml. distilled water, was then added to the gel slurry. The resulting mass was dried at 120° C. The composite contained 25% by weight of the zeolite, based on the calcined mass; it was somewhat softer than composite No. 1 but much harder than the commercially available composite. The dried composite is activated by calcination.

Example III

Composite No. 3 was prepared in a manner not according to the present invention, illustrating the effect of failure to remove ammonium ions from the gelatinous aluminum hydroxide before adding molecular sieve. 747 ml. of 5.87 N ammonium hydroxide was added to one liter of 0.5 M aluminum sulfate solution over a period of 60 minutes, resulting in a slurry of aluminum hydroxide having a pH of 9.3. To one-half of this slurry there was added 8.3 g. of molecular sieve which had been slurried in 50 ml. of distilled water and the resulting mixture was well stirred. Water was removed from the composite by suction filter and the cake was then washed with distilled water four times, employing approximately 350 ml. of water per washing. The resulting mass was dried at 120° C. It contained 25% by weight of molecular sieve, based on the total calcined mass.

The resulting solid composite was crushed and screen-graded to 20 x 40 mesh, packed in a column and dried, calcined and tested for capacity for sorbing normal butane in the manner described in Example I. The capacity of this composite was only 1.7 cc. of n-butane per gram of molecular sieve present. This residual capacity was probably due to the alumina rather than the molecular sieve.

Example IV

To prepare composite No. 4, the remaining half of the slurry of a gelatinous aluminum hydroxide, prepared according to Example III, was washed four times with distilled water to remove the water soluble electrolytes therefrom. A slurry of 8.3 g. of molecular sieve in 50 ml. of distilled water was then added to the washed gel and the composite was dried, resulting in a product containing 25% by weight of molecular sieve based on the calcined mass. The composite was very hard.

Composite No. 4 was calcined and tested for its sorptive capacity for normal butane in the manner described in Example I. The capacity was found to be 21.4 cc. of normal butane per gram of molecular sieve present.

A composite of equally satisfactory hardness and sorption capacity for normal hydrocarbons as composite No. 4 is prepared by substituting ground chabazite for the MS–5A in the above preparation. Similarly, a composite of satisfactory hardness and sorption capacity for water, methane, ethane, etc., is prepared by substituting Linde molecular sieve MS–4A for the MS–5A. A composite of satisfactory hardness and sorption capacity for unbranched cyclic hydrocarbons is prepared by substituting Linde molecular sieve MS–13X for the MS–5A.

Example V

Composite No. 5 was prepared in a manner not according to the present invention, further illustrating the effect of failure to remove soluble electrolytes from the gelatinous aluminum hydroxide before adding the zeolite. In this case 50.8 g. of molecular sieve MS–5A was slurried in a solution of one liter of 0.5 M aluminum sulfate. 652 ml. of 5.97 N ammonium hydroxide was then added to the slurry over a period of about one hour, producing a slurry of gelatinous aluminum hydroxide and sieve having a pH of 9.3. The composite was filtered and washed three times with distilled water and dried at 120° C.

Composite No. 5 was further dried, calcined and tested for butane capacity in the same manner as described in Example No. I. It was found to have a capacity of 1.8 cc. of normal butane per gram of molecular sieve content of the gel.

Example VI

Composite No. 6 is prepared like composite No. 4 of Example IV, except that the amount of molecular sieve is increased. 736 ml. of 5.88 N ammonium hydroxide is added to one liter of 0.5 M aluminum sulfate over a period of about one hour to produce an aluminum hydroxide slurry having a pH of 9.3. Half of the resulting slurry of aluminum hydroxide is filtered by suction and washed three times with distilled water. 25.4 g. of molecular sieve MS–5A, slurried in 100 ml. of water, is then added to the reslurried gelatinous aluminum hydroxide and the resulting composite dried and calcined. This results in a hard composite of high sorbtion capacity, containing about 50% by weight of zeolite.

Example VII

To one-half of the washed aluminum hydroxide slurry prepared according to Example VI is added 76.2 g. of molecular sieve MS–5A in 150 ml. of distilled water. This composite, dried at 120° C., contains about 75% by weight of zeolite and is not substantially harder than a commercial molecular sieve composite containing 20% of clay binder.

Example VIII

Composite No. 8 was produced with aluminum hydroxide obtained by hydrolysis of aluminum isopropylate. 102 g. of redistilled aluminum isopropylate was diluted with 470 ml. of isopropyl alcohol. 235 ml. of distilled water was then quickly added to the resulting isopropylate solution with rapid stirring, resulting in hydrolysis of the isopropylate and precipitation of gelatinous aluminum hydroxide. This hydroxide was then washed six times with 500 ml. washes of distilled water. Water was removed between washes by suction filtering. The washed gelatinous aluminum hydroxide was reslurried in 500 ml. of distilled water. 8.5 g. of Linde MS–5A molecular sieve, slurried in 50 ml. of distilled water, was added to the gel slurry and the resulting mixture was stirred, filtered to remove water, and dried at 120° C. The resulting composite was an exceptionally hard one, containing about 25% of molecular sieve based on the total calcined composite. The composite is activated by calcination.

Example IX

Composite No. 9 was prepared in a similar manner to composite No. 8 of Example VIII, except that about 25 g. of molecular sieve was added so that the resulting calcined composite contained about 50% molecular sieve. Although the resulting composite still had satisfactory hardness it was substantially softer than composite No. 8 containing 25% of molecular sieve. The composite is activated by calcination.

Example X

Composite No. 10 was prepared in a manner similar to composite No. 4 of Example IV except that the wet composite of aluminum hydroxide and zeolite was reslurried in water and spray-dried. The wash water after the fourth washing was found to be free of sulfate ions and to have a pH of about 5. Dry zeolite was added to the wet aluminum hydroxide. The wet composite of gelatinous aluminum hydroxide and MS–5A molecular sieve was reslurried in water to form a slurry containing about 5% of solids (as calcined solids) by weight. This slurry was fed by gravity onto a spinning disk in a chamber through which air at a temperature of about 500° C. was passed from a furnace. The slurry was sprayed into the hot air and rapidly dried, resulting in a flowing mixture of vapor and solids at a temperature of from about 165 to 175° C., which was passed to a cyclone to recover the desired dry solids. The major part of the resulting solids consisted of spheroidal particles of from 15 to 85 microns diameter and of suitable hardness for use in a fluidized separation process. The composite contained about 33% of zeolite (on a calcined basis).

A sample of the composite, screened to 43–61 micron size, was heated at about 150° C. for about two hours and then calcined at about 565° C. for four hours in a flowing stream of dry gas. The attrition resistance of this sample was tested by fluidizing it with air at a temperature of about 500° C. and a velocity of about 100 ft./sec. in a special apparatus, similar to that described by Forsythe and Hertwig, Ind. and Eng. Chem., 41, 1200 (1949), and in the above-identified "Test Methods for Synthetic Cracking Catalysts." After 24 hours, 3.5% of the sample was recovered as particles having a size below 20 microns, produced by attrition of larger particles. This compares with 4.2% attrition, under the same conditions of a commercial silica-alumina cracking catalyst which is known to have high attrition resistance (American Cyanamid "Aerocat Triple A"—25% $Al_2O_3$—75% $SiO_2$).

We claim as our invention:

1. A method for producing a molecular sieve composite which comprises compositing crystallites of a zeolitic molecular sieve material selected from the group consisting of alkali, alkaline earth and combined alkali-alkaline earth metal aluminum silicate zeolites in a substantial amount corresponding to no more than 65% by weight of the total solids in the subsequently calcined product with gelatinous aluminum hydroxide substantially free of ions of soluble salts and drying the composite so obtained.

2. A process according to claim 1 in which wet gelatinous aluminum hydroxide containing water soluble salts is leached by washing with water until the spent wash water is substantially free of ions of soluble salts, prior to compositing said crystallites therewith.

3. A process according to claim 1 in which the dried composite is subsequently calcined at a temperature not exceeding 600° C.

4. A process according to claim 1 in which the crystallites of the zeolite are slurried in water free of electrolyte ions prior to said mixing.

5. A molecular sieve composite comprising alumina and zeolite prepared according to claim 1 and characterized by hardness and resistance to attrition.

6. A method for producing a molecular sieve composite which comprises precipitating aluminum hydroxide by adding a base to an aqueous solution of an aluminum salt, washing the resulting gelatinous aluminum hydroxide until it is substantially free of ions of soluble salts, intimately admixing with the wet aluminum hydroxide crystallites of a zeolitic molecular sieve material selected from the group consisting of alkali, alkaline earth and combined alkali-alkaline earth metal aluminum silicate zeolites in an amount corresponding to from about 25% to 65% by weight of the total solids in the subsequently calcined product to form a wet composite and drying said wet composite.

7. A process according to claim 6 in which said aluminum salt is aluminum sulfate, said base is ammonium hydroxide, and said zeolitic molecular sieve is a composite of $Na_2O$, $CaO$, $Al_2O_3$, and $SiO_2$ having a substantially uniform pore diameter of about 5 Angstrom units.

8. A process according to claim 6 in which said composite of alumina and molecular sieve is produced in the form of microspheroidal particles by spraying an aqueous slurry of said wet composite into a stream of hot gas and recovering solid particles from the resulting gas-solids mixture.

9. A method for producing a molecular sieve composite which comprises adding water to aluminum alcoholate to precipitate aluminum hydroxide, washing the resulting gelatinous aluminum hydroxide until it is substantially free of organic compounds, intimately admixing with the wet aluminum hydroxide crystallites of a zeolitic molecular sieve material selected from the group consisting of alkali, alkaline earth and combined alkali-alkaline earth metal aluminum silicate zeolites in an amount corresponding to from about 25% to 65% by weight of the total solids in the subsequently calcined product and drying the resulting product.

10. A process according to claim 9 in which said aluminum alcoholate is aluminum isopropylate and said zeolitic molecular sieve material is a composite of $Na_2O$, $CaO$, $Al_2O_3$ and $SiO_2$ having a substantially uniform pore diameter of about 5 Angstrom units.

References Cited in the file of this patent

UNITED STATES PATENTS

| | | |
|---|---|---|
| 2,038,566 | Huettner et al. | Apr. 28, 1936 |
| 2,306,610 | Barrer | Dec. 29, 1942 |
| 2,413,134 | Barrer | Dec. 24, 1946 |
| 2,669,547 | Shabaker | Feb. 16, 1954 |
| 2,689,829 | Calmon | Sept. 21, 1954 |